United States Patent [19]

Turner et al.

[11] Patent Number: 4,757,045

[45] Date of Patent: Jul. 12, 1988

[54] CATALYSTS WITH SUPPORT COATINGS HAVING INCREASED MACROPOROSITY AND METHOD FOR PRODUCING THE CATALYSTS

[75] Inventors: Marvin E. Turner, Huntsville, Ala.; Joseph C. Dettling, Howell; Kenneth I. Jagel, Jr., Stanton, both of N.J.

[73] Assignee: Engelhard Corporation, Menlo Park, N.J.

[21] Appl. No.: 569,645

[22] Filed: Jan. 10, 1984

Related U.S. Application Data

[63] Continuation-in-part of Ser. No. 466,183, Feb. 14, 1983, abandoned.

[51] Int. Cl.$^4$ .................... B01J 21/04; B01J 21/06; B01J 23/40; B01J 23/58
[52] U.S. Cl. ................................ 502/252; 502/261; 502/325; 502/328; 502/332; 502/333; 502/334; 423/213.5
[58] Field of Search ............... 502/332, 333, 334, 325, 502/252, 261, 328; 423/213.5

[56] References Cited

U.S. PATENT DOCUMENTS 3,565,830  2/1971  Keith et al. .................. 502/333 X
4,157,316  6/1979  Thompson et al. ........... 502/333 X
4,171,287  10/1979  Keith ........................... 502/334 X Primary Examiner—W. J. Shine

[57] ABSTRACT

A catalyst composition comprises a carrier having a refractory metal oxide support coating thereon and a catalytic platinum group metal dispersed on the support coating. A major portion of the support coating is comprised of a conventional, first metal oxide such as stabilized gamma alumina and a minor portion is provided by a macroporous, second metal oxide such as cordierite. The second metal oxide is conveniently provided by comminuting finished catalyst production scrap. In the method of the invention particles of the first metal oxide are combined with particles of the second metal oxide to form the coating.

20 Claims, No Drawings

CATALYSTS WITH SUPPORT COATINGS HAVING INCREASED MACROPOROSITY AND METHOD FOR PRODUCING THE CATALYSTS

CROSS REFERENCE TO RELATED APPLICATION

This application is a continuation-in-part of U.S. Ser. No. 466,183 filed Feb. 14, 1983, now abandoned.

BACKGROUND

The present invention relates to a catalyst composition and method of making the same, which composition comprises a carrier having a high surface area refractory metal oxide support coating thereon, on which a catalytic metal is dispersed. More particularly, the present invention relates to an improved catalyst composition and method of making the same in which the carrier is a porous refractory metal oxide material and the catalytic metal comprises one or more platinum group metals dispersed on the coating.

U.S. Pat. No. 3,565,830 discloses catalysts comprising a porous, refractory metal oxide carrier which may be formed as a monolithic skeletal body ("honeycomb carrier") having a plurality of parrallel gas flow passages extending therethrough. The carrier has a high surface area refractory metal oxide support coating on which one or more platinum group metal catalytic components are dispersed. As disclosed in this patent, the carrier may be composed primarily of ceramic-like but porous refractory metal oxides including combined forms, for example, alumina, alumino-silicates, and magnesia-silica-aluminas, e.g., cordierite.

U.S. Pat. No. 4,157,316 discloses a catalyst having both oxidation and reduction catalytic properties and of similar composition to that of the U.S. Pat. No. 3,565,830 patent, but comprising one or more base metal oxides in addition to one or more platinum group metals as the catalytic components.

While suitable refractory metal oxides such as cordierite have desirable characteristics such as high temperature and thermal shock resistance which well suits them for use as honeycomb carriers for catalyst compositions of the invention, their surface area is too low to effectively support thereon dispersed catalytic components such as platinum group metals. For this reason the honeycomb carrier is conventionally coated with a thin coating of a high surface area micropore-containing refractory metal oxide on which the catalytic metal component is dispersed. Any suitable high surface area refractory metal oxide is employable as the metal oxide support coating. For example, alumina, preferably active or calcined alumina, beryllia, zirconia, magnesia, silica and combinations of metal oxides such as boria-alumina and silica-alumina, may be employed. High surface area aluminas (which include the chi, gamma, eta, kappa, theta and delta forms) are the most commonly used support coatings. The alumina is usually stabilized against high temperature phase change to low surface area alpha alumina by inclusion therein of additives such as one or more rare earth metal oxides.

Compositions as described in the aforesaid U.S. patents have found particular utility as internal combustion engine exhaust gas pollution abatement catalysts. Similar catalyst compositions have been found useful for other applications including, as disclosed in U.S. Pat. No. 3,928,961, catalytically oxidizing a fuel in a combination operation for purposes of energy production.

In all such applications a gaseous stream (which may comprise a fuel or combustible pollutants and oxygen in cases where oxidation is to be carried out) is passed over the catalyst, and reactive components of the gas stream must contact the catalytic metal component in order to catalyze the reaction. It is therefore necessary that the refractory support coating on which the catalytic metal component is dispersed, and in which a substantial portion of it may be embedded, be sufficiently porous to admit the passage of the gaseous reactants therethrough to contact the catalytic metal component dispersed thereon.

SUMMARY

In accordance with the present invention there is provided, in a catalyst composition comprising (a) a carrier, (b) a refractory metal oxide support coating on the carrier and (c) a catalytic platinum group metal dispersed on the support coating, the improvement comprising that the support coating is provided by a mixture of a major portion of a first refractory metal oxide and a minor portion of a second refractory metal oxide, the first metal oxide having a surface area greater than about 25 square meters per gram (preferably, about 50 to 200, more preferably about 75 to 150 square meters per gram), an accessible pore volume of greater than about 0.03 cubic centimeters per gram, and a pore size range such that at least about 95% of its pore volume is provided by pores having a diameter of less than about 2000 (preferably less than about 1500, more preferably less than about 1200) Angstroms, and the second metal oxide having an accessible pore volume of greater than about 0.03 cubic centimeters per gram (preferably about 0.1 to 0.3 cubic centimeters per gram), a surface area of less than about 25 square meters per gram (preferably, about 0.01 to 5, more preferably about 0.08 to 1.5 square meters per gram), and a pore size range such that at least about 35% of its pore volume is provided by pores having a diameter of at least about 2000 Angstroms when the particles being measured for pore size are at least 44 microns in diameter. Thereafter, the particles may be further comminuted prior to actual incorporation into the catalyst. Preferably, the second metal oxide has a pore size range such that in addition to at least about 35% of its pore volume being provided by pores having a diameter of at least about 2000 Angstroms at least about 5% of its pore volume is provided by pores having a diameter of at least about 5,000 Angstroms. The pores may be as large as 5 to 10 microns though this has not been found to be critical.

Other aspects of the invention provide one or more of the following features: the second metal oxide comprises about 1% to 20%, preferably about 3% to 15%, by weight of the support coating; the first metal oxide is selected from the group consisting of oxides of metals of Groups II, III, and IV of the Periodic Table of Elements having an atomic number not exceeding 40, and mixtures of two or more thereof, and is preferably a high surface area alumina, the second metal oxide is selected from the group consisting of alpha alumina, metal silicates and metal titanates and is preferably selected from the group consisting of cordierite, mullite, alpha alumina and magnesium aluminum titanate; and the catalytic metal further comprises a base metal oxide, preferably a base metal oxide selected from the group consisting of oxides of manganese, iron, cobalt, nickel, rhenium, and mixtures of two or more thereof.

In another aspect of the invention, the second metal oxide is provided by a comminuted catalyst material comprised of: (d) a carrier as defined above and comprising at least 75% by weight of the catalyst material, (e) a support coating comprising a first metal oxide as defined above and coated on the carrier (d), and (f) a catalytic metal as defined above dispersed on the coating of (e). Obviously, when the catalyst material being comminuted has been prepared in accordance with this invention, (e) will additionally contain a second metal oxide as defined above.

In accordance with a major aspect of the invention there is provided a method for producing a catalyst composition having thereon a refractory metal oxide support coating comprised of a first metal oxide and a second metal oxide, the method comprising the steps of:

(a) impregnating a first refractory metal oxide with one or more platinum group metal compounds by mixing the first metal oxide in finely divided particulate form with a liquid dispersion of one or more compounds of the platinum group metals;

(b) mixing a second refractory metal oxide in finely particulate form with the impregnated first metal oxide particles and with a liquid medium to provide a slurry of a mixture of a major portion of impregnated first metal oxide particles and a minor portion of the second metal oxide particles;

(c) contacting a carrier with the slurry of the first and second metal oxide particles to deposit the slurry thereon, and (d) heating the resultant slurry-coated carrier sufficiently to drive therefrom liquid medium of the slurry and to leave on the carrier a refractory metal oxide support coating, wherein the first metal oxide and the second metal oxide have the characteristics as described above with respect to the composition of the invention.

DESCRIPTION OF THE PREFERRED EMBODIMENTS

The present invention essentially provides a more microporous support coating on the carrier by combining in the support coating a second, macroporous, metal oxide with the conventionally employed high surface area porous first metal oxide. The refractory metal oxide support coating, often referred to as a "washcoat", may be applied to the carrier in any known manner such as by dipping the carrier into an aqueous slurry of particles of the refractory metal oxide and then drying by heating the coated carrier in air at an elevated temperature, in order to leave behind a dry, adherent support coating.

Conventional practice in applying catalytic metals (whether platinum group metals or base metals) to the support coating of catalysts of the same general type as those with which the present invention is concerned is illustrated by such as the above-mentioned U.S. Pat. Nos. 3,565,830, 4,134,860, 4,157,316 and 4,171,287, the disclosure of each of which is incorporated by reference herein. As disclosed in these patents, the catalytic metal may advantageously be applied to a finely divided, particulate refractory metal oxide support material by impregnating the particles with a solution or with a dispersion, such as a colloid or gel, in a liquid of a suitable compound of the catalytic metal or metals. For example, aqueous solutions of a water soluble compound of one or more platinum group metals and/or one or more base metals may be used. As used herein and in the claims, "platinum group metal" means and includes platinum, palladium, rhodium, ruthenium, iridium and osmium. The platinum group metal and/or base metal compounds remain upon the alumina support particles and may be fixed therein by known techniques such as $H_2S$, hydrazine or other reduction, air calcination, etc. The base metal oxides may alternatively be supplied in the form of finely divided particles thereof and mixed with the first metal oxide particles. The same first metal oxide particles are usually impregnated with both platinum group metal and base metal compounds when both types of metals are supplied by impregnation.

In order to attain the benefits of the invention by providing a high surface area metal oxide support coating which is satisfactory adherent to the carrier and yet is more permeable than conventional support coatings to the passage of aqueous reactants therethrough for contact with the catalytic metal component dispersed therein, the present invention provides for the substitution of a portion of the conventional high surface area refractory metal oxide particles, e.g., gamma alumina particles, by a relatively low surface area refractory metal oxide which has larger pores and a generally greater pore volume than the conventional support coating material. Such materials, which are sometimes below referred to as "macroporous" materials, are characterized by having a surface area significantly lower than that of the first metal oxide particles which makes them less well suited as a support for catalytic metals, particularly platinum group metals, than the first metal oxide particles. However, their relatively numerous and larger pores as compared to the first metal oxide particles are believed to more readily permit passage of gaseous reactants therethrough, resulting in a desirably more porous support coating. However, particles of such macroporous materials do not adhere to the carrier as well as do particles of the denser, conventional first metal oxide support coatings. Therefore, the amount of such macroporous material which may be substituted for the conventional first metal oxide in the support coating is limited by the adverse affect an excessive quantity of such macroporous material will have on the proportion of the coating which is available to support the catalytic metal component, and the adverse affect on adherence of the coating on the carrier. For these reasons, not more than a minor portion of the combined weight (dry basis) of the conventional, first metal oxide and the macroporous second metal oxide, is provided by the latter. In order to attain to a significant degree the benefit of the increased macroporosity of the support coating of the invention with concomitant greater accessibility of the gaseous reactants to the catalytic metal component, it is preferred that about 1-20%, more preferably about 3-15% by weight (dry basis) of the support coating be provided by the macroporous second metal oxide.

As mentioned above, the macroporous second metal oxide is not considered an effective support medium for the catalytic metal because of its low surface area. Therefore, it is preferred not to impregnate the macroporous second metal oxide with the catalytic metal, particularly when the catalytic metal is an expensive platinum group metal. Generally, if catalytic metal were to be dispersed directly upon the macroporous, second metal oxide it would be expected to sinter under the high temperature conditions usually encountered by the catalyst in use, agglomerating into larger particle sizes and thereby reducing its surface area and catalytic effectiveness. Accordingly, preferably (but not necessarily) only the first metal oxide particles will be impregnated with the catalytic components in an amount calculated to provide the desired loading of catalytic metal component on the finished catalyst. The macroporous second metal oxide particles are combined with the impregnated first metal oxide particles to form a mixed slurry of metal-impregnated first metal oxide particles and metal-unimpregnated second metal oxide particles. This mixture may be further milled as desired. The mixed particle slurry may then be deposited upon the catalyst and dried and/or calcined in the conventional manner.

Any suitable source of a macroporous refractory oxide material may be employed as the second metal oxide material, which may be substantially free of other materials. However, a particularly economic source of the macroporous, second metal oxide is production scrap from the manufacture of catalyst material. In such case, the (scrap) catalyst material which is the source of the second metal oxide will usually also contain some support coating with or without (usually with) a catalytic metal dispersed thereon. For example, the bulk of the catalyst material may comprise a carrier which is made of a refractory metal oxide having the requisite macroporous structure and other properties suitable for the second metal oxide of the present invention. The balance of such catalyst material will usually comprise a refractory metal oxide support coating on the carrier and on such a catalytic metal is dispersed. In the production of such catalyst material, there inevitably occurs a certain amount of scrap, for example, when the monolithic skeletal body of the catalyst material is significantly chipped, cracked or broken. Conventionally, such production scrap has been recycled to recover therefrom the platinum group metal. Such recover operations are expensive in that the valuable platinum group metal is present in a very small, highly dispersed amount, e.g., typically from 0.05% to 0.5% by weight of the total mass of the catalyst material. Expensive chemical leaching or pyrometallurgical techniques or a combination of the two must usually be employed to recover platinum group metal from the scrap.

It has been found, in a preferred aspect of the invention, that such production scrap catalyst material may be comminuted and the resultant particles utilized as the second metal oxide to be combined with the first metal oxide in the support coating of the invention. The support coating on the comminuted material may be, but is not necessarily, identical or similar to the first metal oxide component of the support coating of the invention, e.g., each may comprise alumina or alumina stabilized by one or more metal oxides against thermal degradation. The catalytic metal of the comminuted material in its support coating may be, but is not necessarily, the same metal or metals as the catalytic metal of the composition of the invention. The support coating and catalytic metal component content of the comminuted scrap comprises a relatively minor amount of the scrap material, the carrier usually comprising about at least 70% by weight of the catalyst material (and of the catalyst composition of the present invention) and up to about 95% thereof. In any event, the (scrap) catalyst material support coating must be compatible with the first metal oxide of the support coating of the invention. Further, in calculating the desired total catalytic metal loading on the composition of the invention, the amount of catalytic component contributed by the comminuted (scrap) catalyst material may be taken into account, inasmuch as it is dispersed on its own high surface area support coating and should effectively contribute to the desired catalytic activity of the catalyst of the invention. Obviously, when selecting scrap catalyst material to be used as the source of some or all of the second metal oxide of the invention, one should select a catalyst material which contains a catalytic metal which is identical to at least one of the catalyst metals to be used in the catalyst composition of the invention, or one which is otherwise useful as a component of the catalyst composition of the invention.

Generally, the particle size range of the first metal oxide and of the macroporous second metal oxide has not been found to be critical and the first and second metal oxides may be respectively, of the same or different particle size ranges. There may be some advantage in providing a larger particle size range of the second metal oxide as compared to the first metal oxide particles, as the inclusion of larger size particles may increase crevices or interstitial spaces and thus enhance the permeability of the support coating to the gaseous reactants being treated. Generally, the particle size of both the first and second metal oxide particles lie within a range of about 1 to 150 microns or more preferably up to 100 microns in diameter. More limited size ranges, more preferably 5 to 85 microns in diameter, may be used for one or both the first and second metal oxide particles.

Physical characteristics (surface area, pore volume, pore size range) of the first metal oxide and second metal oxide particles of the invention are described herein and defined in the claims as measured from the material of the two oxides prior to formation of the support coating. It should be recognized that the support coating of the invention is obtained by forming the particles into a coherent coating, for example, by drying and calcining in air at a temperature of from about 100° C. to 900° C. This may result in some modification of the physical characteristics displayed by the particles. Further comminution of the second metal oxide material to the selected particle size range may effect pore size values at the high end of the range.

While the refractory metal oxide support coating of the present invention may be applied to any suitable carrier, including a metal carrier such as a heat and oxidation resistant stainless steel carrier of the type known in the art, it is generally preferred to utilize as the carrier material a refractory metal oxide, porous, ceramic-like material such as cordierite.

Except where otherwise indicated, all percents by weight given in the specification and in the claims are on a dry basis of the materials.

EXAMPLE 1

A slurry of predominantly gamma alumina particles in water was prepared. Ceria in an amount to provide 5% by weight of the combined alumina and ceria is added and the alumina particles have been impregnated with platinum/palladium/rhodium in a weight ratio of 10/4/1 (as metal) and with nickel oxide. The total platinum group metal loading is 0.7% by weight (as metal) and the total nickel oxide loading is 13.7% by weight (as NiO) of the weight of the finished catalyst composition. The slurry particles have a particle size distribution such that 90% by weight of the particles are of 12 microns or less diameter. A sample of this slurry is set aside and denominated Sample A.

A catalyst having the following composition was crushed and comminuted:

| Constituent | % By Weight of Catalyst |
|---|---|
| Cordierite carrier | 73.2 |
| 5% ceria-stabilized alumina wash coat | 22.8 |
| Pt/Pd/Rh 10/4/1 by weight | 0.1 |
| NiO | 3.9 |

Three additional slurry samples, respectively denominated Samples B, C and D are prepared by mixing sufficient crushed catalyst with three different portions of slurry so that 10% by weight of the solids of each of slurry Samples B, C and D is comprised of crushed catalyst and 90% by weight of the solids is comprised of the same type of particles as in the slurry of Sample A. The crushed catalyst was milled to provide the following particle size range distributions:

| Slurry Sample | Particle Diameter Range of Crushed Catalyst Particles in the Slurry |
|---|---|
| A | Contains no crushed catalyst. |
| B | At least 60% of particles are in the range of 20 to 30 microns, with a maximum of 20% greater than 30 microns and a maximum of 20% less than 20 microns. |
| C | At least 60% of particles are in the range of 40 to 50 microns, with a maximum of 20% greater than 50 microns and a maximum of 20% less than 40 microns. |
| D | At least 60% of particles are in the range of 75 to 85 microns, with a maximum of 20% greater than 85 microns and a maximum of 20% less than 75 microns. |

Each of samples A, B, C and D is separately rolled until it is homogeneous and 50 grams of each is poured into a separate crystallizing dish until the bottom of the dish is covered to a depth of not more than about 1.6 mm. The samples are covered with a cheese cloth cover and dried overnight in a 110° dry oven. Large chips of the dried coating are then calcined by heating in air for two hours at 500° C.

A pore size analysis was carried out and showed the following results:

| Pore Radius (Angstroms) Calcined Slurry Sample | Volume (cc per gram) of Pores Having Indicated Size | | | | |
|---|---|---|---|---|---|
| | 0 to 100 | over 100 to 500 | over 500 to $10^3$ | over $10^3$ to $10^4$ | over $10^4$ to $10^5$ |
| A | .2039 | .0734 | .0095 | .004 | 0 |
| B | .1869 | .0542 | .0453 | .0121 | .0012 |
| C | .1773 | .0613 | .02251 | .0104 | .0035 |
| D | .1905 | .0616 | .0197 | .02 | .0011 |

EXAMPLE 2

A series of catalyst samples is prepared as follows:

(A) Catalyst samples identified as Catalysts 1 and 2 are prepared by impregnating two parts by weight of a powdered mixture of 0.8 weight percent baria and 99.2 weight percent predominantly gamma alumina with platinum and rhodium and one part by weight of an identical baria-alumina powder mixture with palladium. The platinum/rhodium impregnation is carried out by mixing the powder with an aqueous amine solution of $H_2Pt(OH)_6$ and $RhCl_3$, and the palladium impregnation is carried out by mixing the powder with an aqueous solution of $PdCl_2$. Proportions of ingredients are selected to provide platinum/palladium/rhodium in a weight ration of 3/3/1 in the finished catalyst. Ceria is mixed into the resultant slurry to provide 3.2% of the total weight. The wet powder is dried and fixed by calcining in air at about 550° C. In all cases, the calcination is believed to decompose the platinum group metal compounds to the metal. The calcined powder either alone or in admixture with a crushed, comminuted finished catalyst as described below is then slurried in water and deposited on a cordierite monolithic support (manufactured by Corning) having 62 flow pasasges per square centimeter (400 flow passages per square inch), dried and calcined in air at about 550° C. The catalyst which is crushed and comminuted for use herein is a catalyst identical to Catalyst 1.

(B) Catalyst samples identified as Catalysts 3 and 4 are prepared in a substantially identical manner as Catalysts 1 and 2, except that a powder mixture of 1.35 weight percent baria, 1.65 weight percent rare earth oxides, and 97.0 weight percent alumina is used.

(C) Catalyst samples identified as catalysts 5-7 are prepared in a manner similar to that of Paragraph (A) of this Example, by impregnating individual aliquots of a powdered mixture of 5.0 weight percent ceria and 95.0 weight percent predominantly gamma alumina with platinum and rhodium by a technique substantially identical to that of Paragraph (A) of this Example, using an aqueous amine solution of $H_2Pt(OH)_6$ and $Rh(NO_3)_3$. Nickel oxide is then added to provide 0.28 grams per cubic inch, the entire mixture is milled to reduce particle size, and the mixture is calcined.

In Paragraph (C) of this Example, proportions are selected so that platinum/rhodium are in a weight proportion of 5/1 in the finished catalyst. The crushed catalyst employed in Catalysts 6 and 7 as described below is the catalyst composition of Catalyst 5.

The resultant catalysts 1-7 have the compositions set out in the following Table 1. As used herein and elsewhere in this specification, "PGM" means platinum group metal, "SC" means metal oxide support coating, "BMO" means base metal oxide, the quantity of PGM catalytic metal components is given in grams per cubic foot of finished catalyst volume and the quantity of BMO catalytic metal (as the oxide) and SC is given in grams per cubic inch of finished catalyst volume. The catalyst volume is the geometric volume of the coated skeletal cordierite body, including the voids provided by the gas flow passages extending therethrough. The number in parentheses after the PGM component is the weight ratio of the individual PGM metals in the order shown.

TABLE I

| Catalyst | PGM Component | PGM Component Loading, g/ft³ | BMO Component Loading, g/in³ |
|---|---|---|---|
| 1 | Pt, Pd, Rh (3/3/1) | 20.3 | CeO₂, 0.06 |
| 2 | " | " | CeO₂, 0.06 |
| 3 | " | " | CeO₂, 0.06 |
| 4 | " | " | CeO₂, 0.06 |
| 5 | Pt, Rh (5/1) | 20.0 | NiO, 0.28 CeO₂, 0.10 |
| 6 | " | " | NiO, 0.28 CeO₂, 0.10 |
| 7 | " | " | NiO, 0.28 |

TABLE I-continued

CeO$_2$, 0.10

| Catalyst | SC Composition % By Weight | SC Loading g/in.$^3$ |
|---|---|---|
| 1 | 90% stabilized alumina 10% crushed catalyst | 1.75 |
| 2 | 100% stabilized alumina | 1.575 |
| 3 | 90% stabilized alumina 10% crushed catalyst | 1.75 |
| 4 | 100% stabilized alumina | 1.575 |
| 5 | 100% stabilized alumina | 2.00 |
| 6 | 95% stabilized alumina 5% crushed catalyst | " |
| 7 | 90% stabilized alumina 10% crushed catalyst | " | employed was fluctuated ±0.5 air-to-fuel units about the five data points (−0.2 to +0.2 units) at 1.0 Hz perturbations. The evaluations were at 485° C. at a gas flow rate of 80,000 volumes of gas per volume of catalyst per hour, calculated at standard temperature and pressure. After aging, the catalysts were evaluated for catalytic efficiency at the indicated conditions, and the results are summarized in Tables II-IV below. The following results show the amount of hydrocarbons ("HC"), carbon monoxide ("CO") and nitrogen oxides ("NOX") which were removed under the indicated evaluation conditions. The "% conversion" shows that weight percentage of the total contaminant present prior to treatment which was removed by passage through the catalyst composition at the indicated air-to-fuel ratio ("A/F").

TABLE II

All catalysts aged for 134 hours
% Conversion At A/F Shown

| Catalyst | −.2 | | | −.1 | | | Stoich. | | | +.1 | | | +.2 | | |
|---|---|---|---|---|---|---|---|---|---|---|---|---|---|---|---|
| | HC | CO | NOX | HC | CO | NOX | HC | CO | NOX | HC | CO | NOX | HC | CO | NOX |
| 1* | 61. | 41. | 76. | 67. | 54. | 70. | 70. | 65. | 60. | 74. | 78. | 43. | 76. | 91. | 40. |
| 2 | 46. | 44. | 68. | 54. | 59. | 65. | 59. | 70. | 54. | 64. | 83. | 43. | 67. | 95. | 34. |
| 3* | 57. | 43. | 77. | 64. | 59. | 75. | 68. | 69. | 60. | 70. | 81. | 47. | 72. | 92. | 30. |
| 4 | 28. | 46. | 51. | 34. | 60. | 50. | 39. | 70. | 41. | 44. | 81. | 32. | 50. | 72. | 26. |
| 5 | 30. | 47. | 63. | 36. | 59. | 59. | 42. | 69. | 47. | 48. | 83. | 38. | 54. | 93. | 32. |
| 6* | 32. | 47. | 62. | 40. | 57. | 60. | 46. | 68. | 60. | 51. | 80. | 40. | 56. | 91. | 33. |
| 7* | 46. | 44. | 77. | 54. | 58. | 72. | 59. | 68. | 60. | 64. | 81. | 47. | 68. | 93. | 30. |

*Those catalysts which contain a second metal oxide in their support coating in accordance with the present invention; the other catalysts are prior art comparative samples.

TABLE III

All catalysts aged for 202 hours
% Conversion At A/F Shown

| Catalyst | −.2 | | | −.1 | | | STOICH. | | | +.1 | | | +.2 | | |
|---|---|---|---|---|---|---|---|---|---|---|---|---|---|---|---|
| | HC | CO | NOX | HC | CO | NOX | HC | CO | NOX | HC | CO | NOX | HC | CO | NOX |
| 1* | 37. | 44. | 49. | 41. | 58. | 43. | 46. | 68. | 38. | 51. | 78. | 30. | 55. | 87. | 22. |
| 2 | 30. | 43. | 39. | 34. | 57. | 34. | 38. | 67. | 31. | 43. | 78. | 24. | 47. | 87. | 16. |
| 3* | 39. | 42. | 41. | 43. | 55. | 37. | 46. | 66. | 33. | 50. | 76. | 29. | 53. | 85. | 24. |
| 4 | 22. | 42. | 13. | 25. | 55. | 15. | 28. | 65. | 14. | 31. | 75. | 14. | 35. | 83. | 13. |
| 5 | 21. | 47. | 28. | 25. | 59. | 28. | 27. | 69. | 26. | 31. | 79. | 25. | 34. | 89. | 21. |
| 6* | 24. | 48. | 31. | 27. | 58. | 31. | 31. | 69. | 30. | 34. | 79. | 28. | 38. | 92. | 24. |
| 7* | 30. | 46. | 40. | 34. | 58. | 39. | 38. | 68. | 35. | 42. | 80. | 32. | 47. | 92. | 27. |

*Those catalysts which contain a second metal oxide in their support coating in accordaance with the present invention; the other catalysts are prior art comparative samples.

Each of the catalyst honeycomb bodies of Table I was mounted in the exhaust stream of a laboratory test automobile engine, aged as described below, and then tested for utilization as a polyfunctional or so-called three-way conversion catalyst, i.e., used to catalyze the substantially simultaneous oxidation of carbon monoxide and unburnt hydrocarbons and reduction of nitrogen oxides. Each composition was aged at −0.1 air to fuel ratio units (which is rich of stoichiometric, see the definition of air-to-fuel ratio units given below) in a variable engine load aging cycle for the identical amount of time. In each case, the engine utilized for the aging burned a normal hydrocarbon gasoline fuel with a lead content of 0.05 grams of lead per gallon of fuel. The air-to-fuel stoichiometric ratio for the fuel in question is 14.65. In Tables II-VI below, air-to-fuel ratio "units" are employed, in which the air-to-fuel ratio of 14.65 is taken as a base line of unit zero. Four other points, at +0.1 units (air-to-fuel ratio of 14.75), +0.2 units (air-to-fuel ratio of 14.85), −0.1 units (air-to-fuel ratio of 14.55) and −0.2 units (air-to-fuel ratio of 14.45), were taken. The positive air-to-fuel units correspond to fuel-lean mixtures and the negative units to fuel-rich mixtures. In the evaluation tests, the air-to-fuel ratio As shown by the data of Tables II and III, with respect to removal of hydrocarbon (HC) and nitrogen oxides (NOX) the catalysts using a metal oxide support coating containing 5% or 10% by weight of crushed catalyst (comprising predominantly cordierite) i.e., catalysts 1, 3, 6 and 7, provided conversion performance which is superior as compared to the catalysts which contained no crushed catalyst, i.e., catalysts 2, 4 and 5. Further, Table III as compared to Table II shows that the catalyst compositions made in accordance with the present invention (Catalysts 1, 3, 6 and 7) show improved performance after protracted use relative to the comparative samples. This suggests that the Catalysts 1, 3, 6 and 7 may be more resistant than the comparative samples to poisoning by the lead content of the fuel used in the tests. The increased porosity of the support coating may account for the apparently enhanced poison resistance. The macroporous material more readily admits the reactants to catalyst metal sites embedded in the interior of the support coating, whereas such lead as deposits on the catalyst is probably trapped on the surface. The catalytic metal dispersed on the support coating is dispersed not only on the surface thereof, but throughout the depth of the support coating.

EXAMPLE 3

A series of catalysts identified as Catalyst T-1 to T-8 was prepared in a manner similar to that described in Paragraph (A) of Example 2 to provide catalysts of the composition indicated in Table IV following, each catalyst comprising a cordierite monolithic body identical to that described in Paragraph (A) of Example 2.

TABLE IV

The PGM Component (as elsewhere in this specification, "PGM" means platinum group metal, "BMO" means base metal oxide and "SC" means metal oxide support coating) in each case is platinum plus rhodium at a weight ratio of Pt, Rh of 5/1 and the PGM Component loading in each case is 20 grams per cubic foot of catalyst. BMO Component in each case is nickel oxide. The stabilized alumina of the SC Composition is in each case 5 weight percent ceria, 95 weight percent predominantly gamma alumina. In each case where a crushed catalyst is used in the SC composition, it is a catalyst of identical composition to the catalyst in which it is used, except for the crushed catalyst substitution for part of the first metal oxide. The crushed catalyst primarily comprises cordierite, plus minor amounts of PGM, BMO and SC.

| Catalyst | BMO Component Loading g/in$^3$ | Percent by Weight Crushed Catalyst in MOSC composition | SC Loading g/in$^3$ |
|---|---|---|---|
| T-1 | 0.37 | 0 | 2.29 |
| T-2* | 0.37 | 5 | 2.28 |
| T-3 | 0.12 | 0 | 1.77 |
| T-4* | 0.12 | 20 | 1.78 |
| T-5* | 0.37 | 20 | 2.29 |
| T-6* | 0.37 | 10 | 2.29 |
| T-7 | 0.12 | 0 | 1.77 |
| T-8* | 0.12 | 20 | 1.71 |

*Catalysts of this invention.

Each of the honeycomb catalyst bodies of Table IV was aged essentially as described above in connection with the catalysts of Table I and evaluated for its ability to convert hydrocarbons, carbon monoxide, and nitrogen oxides. The catalysts of Table V were aged on an engine burning a normal hydrocarbon gasoline fuel with a lead content of 0.012 grams of lead per gallon of fuel at −0.1 air to fuel ratio units (rich of stoichiometric) for the amount of time indicated in the tables below. The catalysts were evaluated at 400° C. at a gas flow rate of 80,000 volumes of exhaust gas per volume of catalyst per hour, calculated at standard temperature and pressure. In the evaluation tests, the air to fuel ratio employed was fluctuated ±1.0 air to fuel ("A/F") units about the five data points (−0.2 to +0.2 units) at 1.0 Hz perturbations. The results of the conversion tests after several periods of aging are given in Tables V-VI below.

TABLE V

All catalysts aged 50 hours
% Conversion At A/F Shown

| Catalyst | −.2 | | | −.1 | | | Stoich. | | | +.1 | | | +.2 | | |
|---|---|---|---|---|---|---|---|---|---|---|---|---|---|---|---|
| | HC | CO | NO | HC | CO | NO | HC | CO | NO | HC | CO | NO | HC | CO | NO |
| T-1 | 79 | 63 | 96 | 88 | 79 | 95 | 92 | 92 | 92 | 94 | 98 | 81 | 95 | 100 | 70 |
| T-2 | 80 | 64 | 97 | 88 | 81 | 96 | 93 | 93 | 90 | 95 | 99 | 80 | 95 | 100 | 71 |
| T-3 | 83 | 63 | 98 | 90 | 79 | 96 | 92 | 90 | 88 | 94 | 95 | 79 | 95 | 100 | 72 |
| T-4 | 83 | 67 | 98 | 90 | 82 | 96 | 92 | 88 | 85 | 93 | 95 | 77 | 94 | 98 | 72 |
| T-5 | 82 | 62 | 97 | 88 | 90 | 95 | 92 | 89 | 89 | 93 | 95 | 80 | 94 | 98 | 71 |
| T-6 | 82 | 66 | 97 | 87 | 79 | 96 | 92 | 91 | 90 | 94 | 97 | 80 | 95 | 99 | 72 |
| T-7 | 83 | 68 | 98 | 89 | 79 | 93 | 91 | 87 | 84 | 93 | 93 | 77 | 93 | 98 | 72 |
| T-8 | 84 | 73 | 98 | 89 | 82 | 95 | 91 | 90 | 86 | 92 | 94 | 81 | 93 | 98 | 77 |

TABLE VI

All catalysts aged 150 hours
% Conversion at A/F Shown

| Catalyst | −.2 | | | −.1 | | | Stoich. | | | +.1 | | | +.2 | | |
|---|---|---|---|---|---|---|---|---|---|---|---|---|---|---|---|
| | HC | CO | NO | HC | CO | NO | HC | CO | NO | HC | CO | NO | HC | CO | NO |
| T-1 | 81 | 63 | 95 | 88 | 75 | 89 | 90 | 82 | 82 | 91 | 88 | 76 | 92 | 93 | 71 |
| T-2 | 81 | 65 | 97 | 88 | 77 | 89 | 91 | 85 | 82 | 92 | 90 | 65 | 93 | 97 | 72 |
| T-3 | 83 | 63 | 94 | 88 | 72 | 87 | 90 | 77 | 77 | 91 | 85 | 73 | 92 | 92 | 70 |
| T-4 | 85 | 65 | 95 | 89 | 73 | 84 | 90 | 79 | 79 | 91 | 86 | 73 | 92 | 92 | 69 |
| T-5 | 82 | 63 | 85 | 88 | 73 | 88 | 89 | 80 | 80 | 91 | 87 | 75 | 92 | 92 | 69 |
| T-6 | 80 | 62 | 97 | 88 | 75 | 89 | 90 | 82 | 82 | 92 | 91 | 75 | 92 | 95 | 70 |
| T-7 | 83 | 58 | 91 | 87 | 67 | 81 | 88 | 73 | 76 | 89 | 80 | 71 | 90 | 88 | 68 |
| T-8 | 89 | 72 | 95 | 91 | 77 | 89 | 92 | 82 | 83 | 92 | 87 | 79 | 93 | 91 | 76 |

As seen from the data of Tables V-VI, catalysts containing a minor amount of the metal oxide support coating in the form of crushed finished catalyst (predominantly cordierite) performed in a manner generally comparable to or better than otherwise equivalent catalysts utilizing conventional metal oxide support coatings which do not contain crushed catalyst, i.e., cordierite, in the metal oxide support coating.

Yet another series of catalyst samples was prepared in a manner similar to that shown in Paragraph (A) of Example 2 to produce a series of oxidation catalysts containing 20 grams per cubic foot of platinum and palladium in a weight ratio of 1/5. The catalysts were prepared utilizing 0, 5%, 10% and 20% by weight crushed catalyst to partially replace the conventional stabilized alumina of the support coating. The crushed catalyst was of identical composition to the catalyst in which it is used, less the crushed catalyst content. These catalysts were aged in a manner identical to that used for the catalysts of Tables II and III and were tested for oxidation activity in an eight chamber reactor by being placed in an engine exhaust gas test stream behind (downstream of) an oxidation-reduction catalyst loaded with 40 grams per cubic foot of platinum and rhodium in a weight ratio of 12/1. In each case the starting alumina support coating contained 5 weight percent ceria and 95 weight percent alumina. Prior to the test, the platinum/rhodium oxidation-reduction catalyst was aged on a normal hydrocarbon gasoline containing 0.004 grams of lead per gallon of fuel. During the test, 6% by volume air was added to the exhaust stream fed to the oxidation catalysts, both during aging and evaluation. The results of this testing showed generally comparable performances for the catalysts in which 5, 10 and 20% of the conventional metal oxide was replaced by the crushed catalyst, as compared to the conventional catalyst.

Tests were also conducted on catalyst compositions containing up to 20% crushed catalyst substituting for the conventional metal oxide of the SC to determine the light off capability of such catalysts. Light-off is the lowest temperature at which such catalysts will initiate oxidation reaction. As in the hydrocarbon, carbon monoxide and nitrogen oxide conversion tests, the catalysts of the invention containing up to 20% crushed monolith in the SC performed in a manner generally at least comparable to the conventional catalysts. As indicated by the data of Tables II and III above, the catalysts of the invention under certain circumstances provide performance superior to those of conventional catalysts and, as mentioned above, may have superior resistance to lead poisoning. Whether providing superior or only comparable performance, the catalysts of the present invention have a great economic advantage in permitting the recycle of scrap catalyst material, as described above.

EXAMPLE 4

In order to demonstrate the actual pore size volume of the second metal oxide material as a function of particle size at the time of the measurement, a cordierite honeycomb catalyst support (Corning 400) was tested as follows:

A first specimen (hereinafter "BULK") of the solid material about 1"×¾"×⅛" was tested for pore size volume "as is"; then a larger sample of the same material was crushed, ground, and seived to the specified particle sizes. Thereafter, the pore size volume was determined by a conventional mercury porosimeter. The results were:

| Particle Size | % Greater than 2000 Angstroms |
|---|---|
| BULK | 95 |
| 105–149 | 50.7 |
| 44–105 | 41.4 |

Thus, it is necessary to define the particle size of the second metal oxide when referring to the pore size thereof.

While any suitable macroporous material may be used as the second metal oxide of the invention, the porous, refractory metal oxides and combined oxides conventionally used to make ceramic-like carriers are preferred. Such materials are essentially crystalline in form and marked by the absence of any significant amount of glassy or amorphous matrices. One or more of such materials is commercially available in the form of extruded bodies having a plurality of parallel, fine gas flow passages extending therethrough. While cordierite is preferred, the second metal oxide may also be selected from the group consisting of alpha alumina, metal silicates in general, specifically, alumina silicates, zirconium silicates and magnesium aluminum silicates. Sillimanite, spodumene, mullite, petalite, zirconia and combinations thereof are also known and suitable for use as the second metal oxide. Such materials are also suitable for use as the carrier of the invention.

Generally, any useful catalytic metals may be employed in the catalysts of the invention in addition to one or more platinum group metals. As sometimes used in the specification and as used in the claims, the term "catalytic metal" means and includes one or more catalytically effective metals, whether in the form of elemental metal(s), compound(s) such as oxide(s), alloy(s) or intermetallic compound(s). The term "catalytic platinum group metal" is defined identically but with respect to the six platinum group metals identified elsewhere in this specification.

While the invention has been described in detail with respect to preferred embodiments thereof, it will be apparent that upon a reading and understanding of the foregoing other modifications and alterations to the specific embodiments may well occur to those skilled in the art. It is intended to include all such alterations and modifications within the scope of the appended claims.

We claim:

1. In a catalytic composition comprising (a) a carrier, (b) a refractory metal oxide support coating on the carrier and (c) a catalytic platinum group metal dispersed on the support coating, the improvement comprising that the support coating is provided by a mixture of a major portion of a first refractory metal oxide, and a minor portion of a second refractory metal oxide, the first metal oxide having a surface area greater than about 25 square meters per gram, an accessible pore volume of greater than about 0.03 cubic centimeters per gram, and a pore size range such that at least about 95% of its pore volume is provided by pores having a diameter of less than about 2000 Angstroms, and the second metal oxide having an accessible pore volume of greater than about 0.03 cubic centimeters per gram, a surface area of less than about 25 square meters per gram, and a pore size range such that at least about 35% of its pore volume is provided by pores having a diameter of at least about 2000 Angstroms when the second metal oxide particles being measured for pore size are at least 44 microns in diameter, wherein essentially all of the catalytic platinum group metal is dispersed on the first refractory metal oxide.

2. The composition of claim 1 wherein the second metal oxide has a pore size range such that at least about 5% of its pore volume is provided by pores having a diameter of at least about 5,000 Angstroms.

3. The composition of claim 2 wherein the second metal oxide has an accessible pore volume of about 0.1 to 0.3 cubic centimeters per gram and comprises about 1% to 20% by weight of the support coating.

4. The composition of claim 1 wherein the first metal oxide has a surface area of from about 50 to 200 square meters per gram, and the second metal oxide has a surface area of from about 0.01 to 5 square meters per gram, an accessible pore volume of about 0.1 to 0.3 cubic centimeters per gram and a pore size range such that at least about 5% of its pore volume is provided by pores having a diameter of at least about 5,000 Angstroms.

5. The composition of claim 4 wherein the second metal oxide comprises about 1% to 20% by weight of the support coating.

6. The composition of claim 1 wherein the first metal oxide has a surface area of from about 75 to 150 square meters per gram, and the second metal oxide comprises about 3% to 15% by weight of the support coating and has a surface area of from about 0.01 to 5 square meter per gram and a pore size range such that at least about 5% of its pore volume is produced by pores having a diameter of at least about 5,000 Angstroms.

7. The composition of claim 1 wherein the first metal oxide has a surface area of about 50 to 200 square meters per gram and is selected from the group consisting of oxides of metals of Groups II, III, and IV of the Periodic Table of Elements having an atomic number not exceeding 40, and mixtures of two or more thereof, and the second metal oxide is selected from the group consisting of metal silicates, alpha alumina and metal titanates.

8. The composition of claim 1 wherein the first metal oxide comprises alumina having a surface area from about 50 to 200 square meters per gram and the second metal oxide is selected from the group consisting of cordierite, mullite, alpha alumina, and magnesium aluminum titanate.

9. The composition of claim 1 wherein the carrier is a monolithic skeletal structure comprised of a second metal oxide as defined in claim 1.

10. The composition of claim 1 wherein the second metal oxide is provided by a comminuted catalyst material comprised of: (d) a carrier as defined in claim 1 and comprising at least about 70% by weight of the catalyst material, (e) a support coating comprising a first metal oxide as defined in claim 1 and coated on the carrier of (d), and (f) a catalytic metal as defined in claim 1 dispersed on the coating of (e).

11. The composition of claim 10 wherein the first metal oxide and the coating of (e) are each alumina having a surface area of at least 50 square meters per gram and the second metal oxide is selected from the group consisting of cordierite, mullite, alpha alumina and magnesium aluminum titanate.

12. The composition of claim 10 wherein the particle sizes of the first and second metal oxides are each about 1 to 150 microns.

13. The composition of claim 12 wherein the particle size of the second metal oxide is greater than that of the first metal oxide.

14. A catalyst composition comprising a carrier, a refractory metal oxide support coating on the carrier, and a catalytic platinum group metal dispersed on the support coating wherein
(A) the support coating is provided by a dried mixture of from about 99% to 80% by weight of a first refractory metal oxide and from about 1% to 20% by weight of a second refractory metal oxide,
(B) the first metal oxide is selected from the group consisting of oxides of metals of Groups II, III, IV of the Periodic Table of Elements having an atomic number not exceeding 40, and mixtures of two or more thereof, and has a surface area of from about 50 to 200 square meters per gram, and accessible pore volume of greater than about 0.03 cubic centimeters per gram, and a pore size range such that at least about 95% of its pore volume is provided by pores having a diameter of less than about 2000 Angstroms,
(C) the second metal oxide is selected from the group consisting of alpha alumina, metal silicates and metal titanates and has an accessible pore volume of about 0.1 to 0.3 cubic centimeters per gram, a surface area of about 0.01 to 5 square meters per gram, and a pore size range such that at least about 35% of its pore volume is provided by pores having a diameter of at least about 2000 Angstroms and at least about 5% of its pore volume is provided by pores having a diameter of at least about 5,000 Angstroms when the second metal oxide particles being measured for pore size are at least 44 microns in diameter, and
(D) essentially all of the catalytic platinum group metal is dispersed on the first metal oxide.

15. The composition of claim 14 wherein the first metal oxide comprises alumina and the second metal oxide is selected from the group consisting of cordierite, mullite, alpha alumina and magnesium aluminum silicate, comprises about 3 to 15% by weight of the support coating.

16. A method for producing a catalyst composition having thereon a refractory metal oxide support coating comprised of a major amount of a first metal oxide and a minor amount of a second metal oxide, the method comprising the steps of:
(A) impregnating a first refractory metal oxide with one or more platinum group metal compounds by mixing the first metal oxide in finely divided particulate form with a liquid dispersion of one or more compounds of the platinum group metals;
(B) mixing a second refractory metal oxide in finely divided particulate form with the impregnated first metal oxide particles and with a liquid medium to provide a slurry of a mixture of a major portion of metal impregnated first metal oxide particles and a minor portion of the second metal oxide particles;
(C) contacting the carrier with the slurry of the first and second metal oxide particles to deposit the slurry thereon, and
(D) heating the resultant slurry-coated carrier sufficiently to drive therefrom the liquid medium of the slurry and to leave on the carrier a refractory metal oxide support coating, wherein the first metal oxide has a surface area greater than about 25 square meters per gram, an accessible pore volume of greater than about 0.03 cubic centimeters per gram, and a pore size range such that at least about 95% of its pore volume is provided by pores having a diameter of less than about 2000 Angstroms, and the second metal oxide has an accessible pore volume of greater than about 0.03 cubic centimeters per gram, a surface area of less than about 25 square meters per gram, and a pore size range such that at least about 35% of the pore volume of the second metal oxide is provided by pores having a diameter of greater than about 2000 Angstroms when the second metal oxide particles being measured for pore size are at least 44 microns in diameter.

17. The method of claim 16 wherein the second metal oxide has an accessible pore volume of about 0.1 to 0.3 cubic centimeters per gram, a pore size range such that at least about 5% of its pore volume is provided by pores having a diameter of at least about 5,000 Angstroms, and comprises about 1% to 20% by weight of the support coating.

18. The method of claim 17 wherein the second metal oxide particles are produced by comminuting a catalyst material which is comprised of (i) a carrier as defined in claim 17 and comprising at least about 70% by weight of the catalyst material, (ii) a support coating comprising a first metal oxide as defined in claim 17 and coated on the carrier of (i), and (iii) a catalytic metal as defined in claim 17 and dispersed on the coating of (ii).

19. The method of claim 17 wherein the first metal oxide has a surface area of from about 50 to 200 square meters per gram, and is selected from the group consisting of oxides of metals of Groups II, III and IV of the Periodic Table of Elements having an atomic number not exceeding 40, and mixtures of two or more thereof, and the second metal oxide has a surface area of from about 0.01 to 5 square meters per gram and is selected from the group consisting of alpha alumina, metal silicates and metal titanates.

20. The method of claim 19 wherein the first metal oxide comprises alumina and the second metal oxide is selected from the group consisting of cordierite, mullite, alpha alumina, and magnesium aluminum titanate.

* * * * *